ADVERTISING DISPLAY DEVICE

Filed Aug. 2, 1951

INVENTOR.
Charles W. Long
BY
Louis Necho
Attorney

United States Patent Office

2,705,381

Patented Apr. 5, 1955

2,705,381

ADVERTISING DISPLAY DEVICE

Charles W. Long, Philadelphia, Pa.

Application August 2, 1951, Serial No. 239,995

1 Claim. (Cl. 40—28)

My invention relates to a display advertising device and more particularly to a display advertising device especially adapted for use in promoting the sale of phonograph records.

The structure, advantage and manner of use of my display advertising device are set forth in the following specification and the accompanying drawing in which.

The display device of my invention is especially designed for use in connection with the portable, or non-portable, disc record player whether it is of the type which can handle only one record at a time or whether it be of the type which receives a number of records and plays them successively. To that end, the display advertising device of my invention is designed to be detachably mounted on, and to be operated by, the record player.

Figure 1:
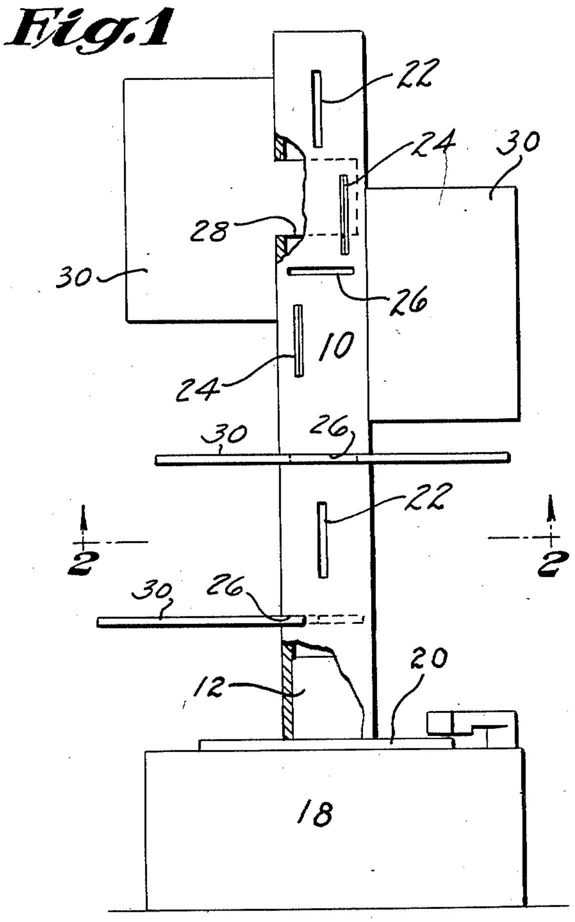
Fig. 1 is an elevational view of the device, certain parts being broken away to show details of construction.
Figure 2:
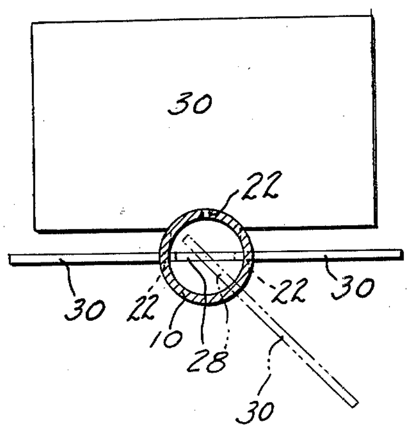
Fig. 2 is a section looking in the direction of line 2—2 on Fig. 1.
Figure 3:
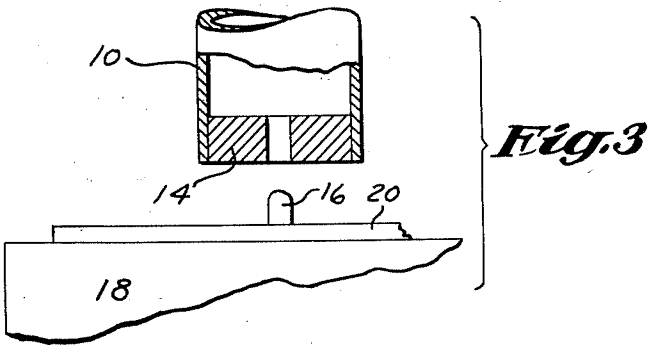
Fig. 3 is a fragmentary, exploded view showing details of construction.

As shown in Fig. 1, my display device includes a cylindrical member 10 having an internal diameter such as to fit snugly over the upper end 12 of the driving shaft of certain types of record players, such for example, as the record player made and sold by the Radio Corporation of America. For use in connection with other types of record players which do not have the collar 12, a bushing 14 is used so as to adapt the device for engagement directly with the upper end of the driving shaft 16 as shown in Fig. 3. The record player 18 is only shown in outline because its specific mechanism forms no part of the present invention and because its structure and operation are well known. It is sufficient, for the purpose of this disclosure, to say that the cylindrical member 10 is so mounted as to be rotated by the shaft which rotates the turn table 20 of the record player.

The cylindrical member 10 is made of any desirable rigid, light material, such as cardboard and is painted or printed with any desired colors or indicia. The cylindrical member 10 is also provided with vertically aligning longitudinal slots 22, vertically staggered longitudinal slots 24 and suitably distributed transverse slots 26. The slots 22, 24 and 26 are adapted to receive the tabs 28 of show cards 30. The show cards 30 are inscribed, on one or on both sides thereof, with the desired advertising material such as the name of a record and the picture and name etc. of the recording artist or orchestra. When the cards 30 are mounted in vertical slots 22 and 24 and the cylindrical member 10 is rotated by the shaft 16, of a record player placed in a show window, the indicia on the cards 30 will become successively visible to passersby. When the cards are mounted in the transverse slots 26 they are used to support an object to be advertised such as a record, a small model of a record player, sheet music and the like. The cards 30 may be of the shape shown or of any other shape. The cylindrical member 10 is preferably die-stamped of a flat sheet and subsequently rolled, but may be in the form of a rod slotted as shown.

It will thus be seen that by merely providing the cylindrical member 10, with or without bushing 14, and the cards 30, I have produced a very effective and very inexpensive advertising display which is adapted for use in connection with all types of record players.

While I have shown and described the display device in connection with a record player it is obvious that the same may be used in connection with any turn table on which the cylindrical member 10 may be mounted.

What I claim is:

The combination with a record player having a horizontal turn table and a vertical shaft for turning said turn table, with the end of said shaft extending above said table, an upright member having a bore in its lower end for engaging the upper end of said shaft with the lower end of said member resting on said turn table, there being vertically extending, but vertically non-aligning slots formed in said upright member, there also being horizontal slots formed in said member, indicia-bearing cards, and a tab on one edge of each of said cards interchangeably engageable with one of the vertical, or with one of the horizontal, slots.

References Cited in the file of this patent

UNITED STATES PATENTS

| | | |
|---|---|---|
| 667,576 | Richter | Feb. 5, 1901 |
| 891,135 | Beach | June 16, 1908 |
| 1,170,325 | Poposkey | Feb. 1, 1916 |
| 1,509,125 | Burbank | Sept. 23, 1924 |
| 2,143,592 | Baldeck | Jan. 10, 1939 |

FOREIGN PATENTS

| | | |
|---|---|---|
| 191,108 | Switzerland | Aug. 2, 1937 |
| 847,525 | France | July 3, 1939 |
| 596,534 | Great Britain | Jan. 6, 1948 |